United States Patent [19]

Shull et al.

[11] 4,204,771
[45] May 27, 1980

[54] TUNING OF ETALONS

[76] Inventors: Arthur Shull, 110 Highgate Pl.;
George J. Wolga, 324 Snyder Hill
Rd., both of Ithaca, N.Y. 14840

[21] Appl. No.: 903,862

[22] Filed: May 8, 1978

[51] Int. Cl.² ............................................... G01B 9/02
[52] U.S. Cl. .................................... 356/346; 356/352
[58] Field of Search ................................ 356/346, 352

[56] References Cited

U.S. PATENT DOCUMENTS

| | | | |
|---|---|---|---|
| 2,941,444 | 6/1960 | Frykman | 356/51 |
| 3,323,651 | 3/1967 | Mack et al. | 356/346 |
| 3,324,428 | 6/1967 | Jacobs | 350/358 X |
| 3,377,912 | 4/1968 | Yates | 356/346 |
| 3,387,531 | 6/1968 | Hesse | 356/352 |
| 3,877,818 | 4/1975 | Button et al. | 356/416 |
| 3,914,055 | 10/1975 | Wolga et al. | 356/75 |
| 4,076,422 | 2/1978 | Kohno | 356/346 |

Primary Examiner—John K. Corbin
Assistant Examiner—Matthew W. Koren
Attorney, Agent, or Firm—Theodore B. Roessel; J. Stephen Yeo

[57] ABSTRACT

The transmission characteristics of an etalon are varied by changing the angle of incidence of the light beam on the stationary etalon. As examples of the invention, the etalon may be preceeded by a rotatable mirror or a Bragg cell, either of which is arranged to deflect the light beam. The stationary etalon may be used as an optical element in an instrument.

1 Claim, 7 Drawing Figures

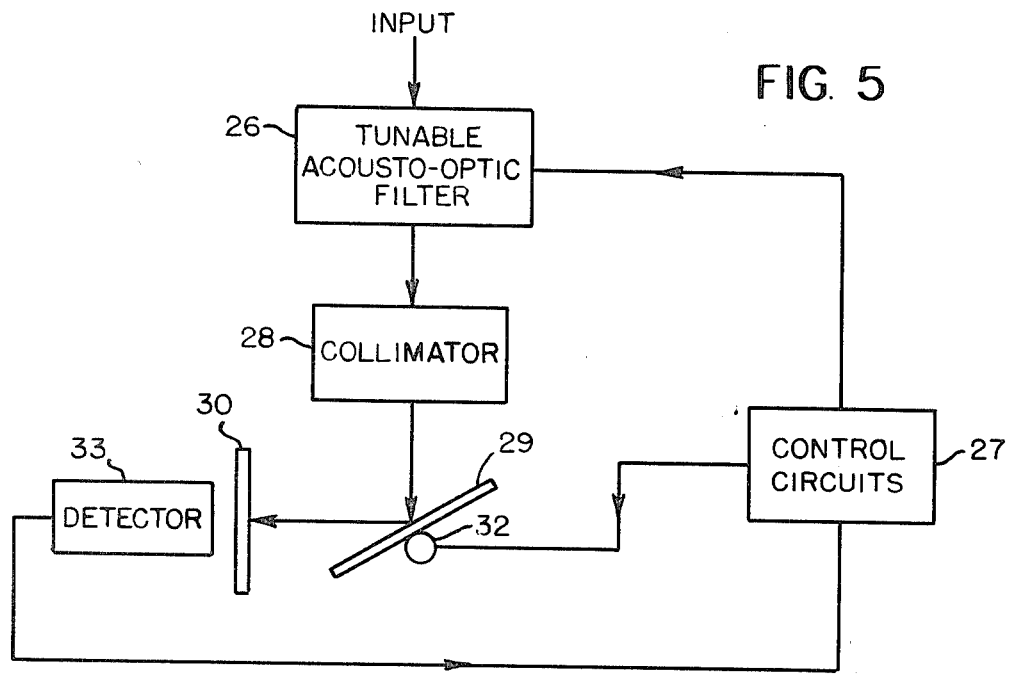
FIG. 5
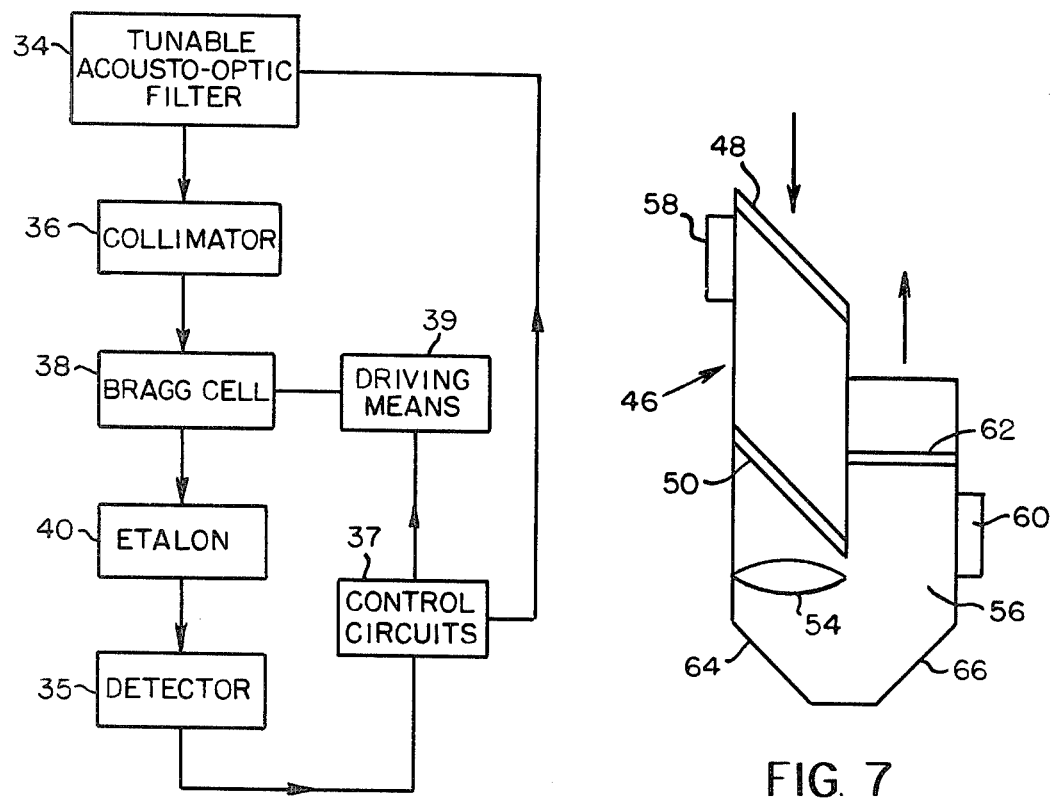
FIG. 6
FIG. 7

TUNING OF ETALONS

RELATING PATENTS

U.S. Pat No. 3,914,055, issued Oct. 21, 1975 to Wolga et al for "Instrument for High Resolution Spectral Analysis with Large Optical Throughput" is incorporated by reference. Harris, U.S. Pat. No. 3,679,288 and Chang U.S. Pat. No. 4,052,121 are cited in the specification.

BACKGROUND OF THE INVENTION

This invention relates generally to tunable optical filters used in spectroscopic apparatus and Fabry Perot etalons as optical elements in particular.

Etalons achieve the highest resolution of any known optical element. Measurements have been made to thousandths of an wavenumber. Etalons are usually constructed so as to have two plane surfaces which face each other. The surfaces are separated by a spacer so as to be parallel, and are coated with a material so as to be partially reflective. A light beam directed to the etalon will be reflected many times between the coated surfaces with the result that only certain frequencies of light will pass through the etalon.

The etalon has the characteristics of a comb filter in that it passes light in a plurality of evenly spaced passbands. The passbands are also known as orders, which are individually numbered and are evenly separated by the free spectral range of the etalon. The separation is measured in wavenumbers.

For application in spectroscopic and like devices it is necessary to adjust the frequency characteristics of the etalon. It is known that both the center wavenumber of a given order and the spacing between orders are dependent upon the distance between the partially reflective surfaces. A number of methods have been devised to alter the spacing between the parallel plates. These methods include the use of pneumatic cells, piezoelectric devices and mechanical arrangements; all employed to effectively move the parallel plates together or apart.

While the methods described work well under most circumstances, they are subject to inaccuracies and call for delicate structure.

Etalons may also be tuned by a method described by Wolga et al. in U.S. Pat. No. 3,914,055. This method calls for an etalon having a fixed plate separation to be rotated by a motor or linkage with respect to fixed light beam. The effect is to change the optical distance between the plates even though the plate separation does not actually change. Tuning by turning the etalon is limited in speed by the inertia of the etalon.

It is an object of the present invention to provide an adjustable etalon without the aforementioned limitations.

SUMMARY OF THE INVENTION

The angle with which a collimated light beam is incident on an etalon is varied by deflecting the beam rather than moving the etalon. The result is that the passbands of the etalon are shifted to other wavenumbers. The beam may be deflected by a mirror or a Bragg cell.

The tunable etalons may be used with tunable optical filters in an improved instrument for spectral analysis. Said instrument may be made from a piece of acousticoptical material.

DESCRIPTION OF THE DRAWINGS

FIG. 5 represents the first embodiment used in an instrument for spectral analysis.

FIG. 6 represents the second embodiment used in an instrument for spectral analysis.

FIG. 7 shows a refinement of the device of FIG. 6.

DETAILED DESCRIPTION OF THE PREFERRED EMBODIMENTS

Figure 1A:
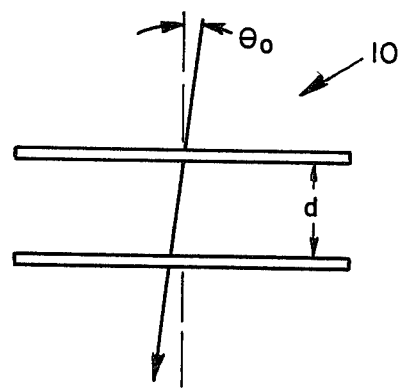
FIG. 1 is a representation of an etalon having light beams incident at different angles.
Figure 1B:
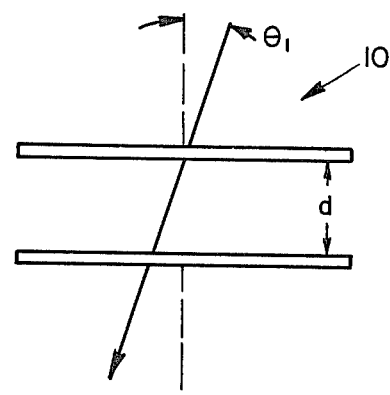

FIGS. 1a and 1b represent an etalon 10 having two parallel plates separated by a constant distance "d". In FIG. 1a, a collimated light beam is incident on the etalon 10 at an angle $\theta_0$ with respect to the normal. If, as in FIG. 1b, the incident angle is changed to a new angle $\theta_1$ the wavenumber, $\bar{\eta}$, of the etalon will be a function only of the new angle $\theta_1$ and the starting angle $\theta$, thus:

$$\Delta \bar{\eta} = \bar{\eta}_1 \frac{\cos \theta_0 - \cos \theta_1}{\cos \theta_0} \approx \bar{\eta}_0 \frac{\cos \theta_0 - \cos \theta_1}{\cos \theta_0}$$

for the same order. For clarity the angles are exaggerated in the drawing so are not to be taken as quantitative representations of scale or magnitude.

According to the invention the incident angle is changed by moving the light beam while maintaining the etalon in a fixed position.

Figure 2A:
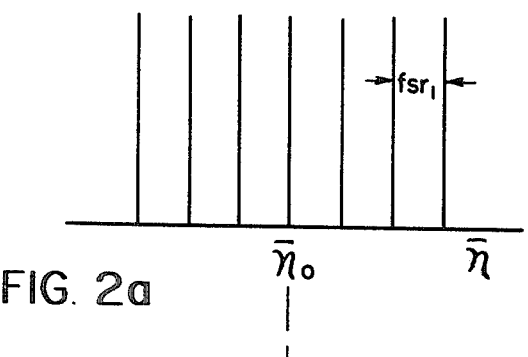
FIG. 2 shows the transmission characteristics of the etalon of FIG. 1.
Figure 2B:
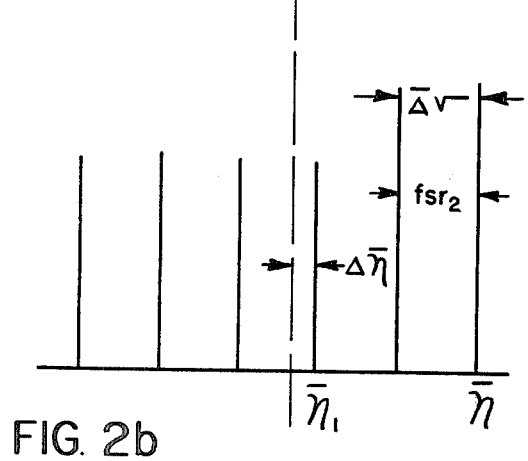

FIGS. 2a and 2b illustrate the transmission characteristics of the same etalon for the two incident angles of incident light, $\theta_0$ and $\theta_1$. Note that the wavenumber $\bar{\eta}_0$ of the corresponding orders change as well as "fsr", the distance between orders, (free spectral range).

$$fsr = 1/2nd \cos \theta$$

where "n" is the index of refraction and "d" is the spacing between plates.

Figure 3:
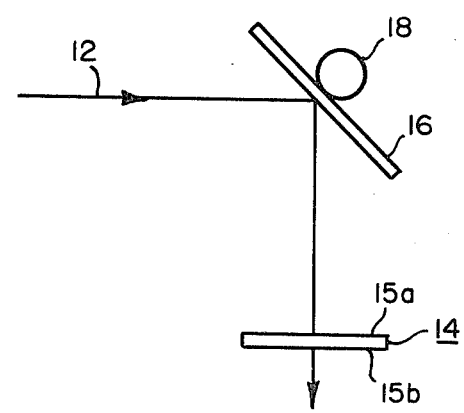
FIG. 3 is a first embodiment of the invention using a mirror.

A first embodiment of the invention is seen in FIG. 3. A collimated light beam 12 is reflected to a secured etalon 14 by a tuning mirror 16. Etalon 14 is comprised of plates 15a, 15b whose angular position and spacing are fixed. The tuning mirror 16 is caused to be moved so as to deflect the light beam 12 and thereby change the incidence angle at the etalon. A preferred arrangement is to have mirror 16 affixed to the shaft of a scanning servomotor 18 so that the etalon can be tuned by electrical means.

Figure 4:
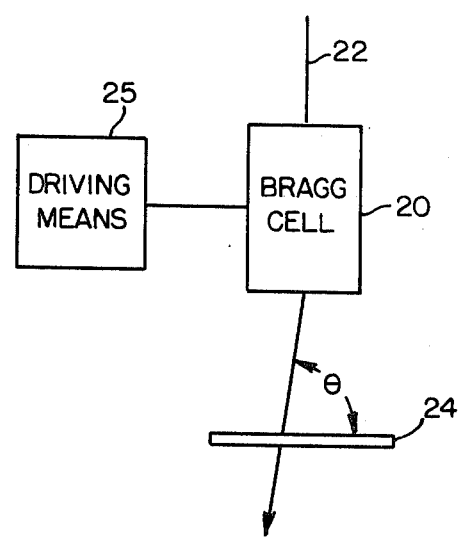
FIG. 4 illustrates a second embodiment of the invention, using a Bragg cell.

Another embodiment of the invention is illustrated by FIG. 4. Here a Bragg cell 20 is interposed between a collimated light beam 22 and an etalon 24. A Bragg cell is a known device constructed of optical anisotropic medium excited by acoustic transducers and which deflects a light beam in response to an acoustic signal from driving means 25. As used in the embodiment of FIG. 4, the Bragg cell varies the light beam's angle of incidence on the etalon 24 thereby providing frequency tuning.

The Bragg cell thus used in this configuration is optically equivalent to a mirror and servomotor, and so may be substituted, for the mirror and servomotor in the previously described embodiment of the present invention.

One advantage of using a Bragg cell is that the light deflection is predictable so it is possible to program the tuning of the etalons, without feedback, as there is no slippage, or other error sources possible in mechanism having movable parts.

The embodiments of my invention may be used as optical elements in spectroscopic apparatus. For example, Wolga et al in U.S. Pat. No. 3,914,055 described an instrument for spectral analysis including a tunable acoustooptic filter followed by one or more etalons in optical series. The tunable acoustooptic filter may be of the type described in Harris in U.S. Pat. No. 3,679,288 or Chang in U.S. Pat. No. 4,052,121, both of which are constructed of optical anisotropic medium excited by acoustic transducers. The acoustooptic filter has essentially a single passband and eliminates most of the light other than that of a particular wavenumber which appears at the filter's output. The output is preferably a collimated beam so a collimater may be included. The Wolga instrument includes etalons tuned so as to have orders coincide with the passband of the acoustooptic filter. The etalons have narrow passbands thereby increasing the resolution of the instrument.

FIG. 5 shows a tunable acoustooptic filter 26 followed by a collimator 28 and an etalon 30. Etalon 30 is tuned by a mirror 29 driven by servomotor 32 in keeping with the first embodiment.

FIG. 6 shows a tunable acousto-optic filter 34 followed by a collimator 36, Bragg cell 38, with driving means 39, and etalon 40 in keeping with the second embodiment.

The present invention pertains to optical elements. A complete instrument may also include detectors 33, 35 and control circuits 27, 37, such as described by Wolga et al in the afore cited U.S. Pat. No. 3,914,055.

It will now be seen that the optical components of a spectroscopic apparatus may be machined from the same piece of optically anisotropic medium. Referring to FIG. 7, both acoustooptic filter 42 and a Bragg cell 44 are fabricated from the same piece optically anisotropic medium 46. Following Harris, a polarizer 48, and analyzer 50 are placed at the ends of a section of medium 46 forming filter 42. A collimator lens 54 may be machined in the medium 46 to be in the output beam of filter 42.

These components are followed by a section of the medium used for a Bragg cell 56.

Acoustic transducers 58, 60 are bonded to the medium to control filter 42 and Bragg cell 56.

A etalon 62 may be formed by cutting parallel planes in the material and coating the planes with reflective material. Reflective inclusions or cuts 64, 66 may be used to bend the optical path.

Having described our invention and various embodiments thereof, we claim:

1. An improved instrument for spectral analysis having a tunable acoustooptic filter providing a collimated output light beam and an etalon in optical communication with said light beam so that said beam is incident to said etalon, wherein the improvement comprises:
   a Bragg cell arranged to deflect said beam, thereby changing the beam's angle of incidence on said etalon; and
   wherein said tunable acoustooptic filter, said Bragg cell, and said etalon are fabricated from the same piece of optically anisotropic medium.

* * * * *